United States Patent
Besse et al.

(10) Patent No.: US 11,878,786 B2
(45) Date of Patent: Jan. 23, 2024

(54) PROPULSION SYSTEM FOR AN AIRCRAFT

(71) Applicants: SAFRAN, Paris (FR); SAFRAN AIRCRAFT ENGINES, Paris (FR); SAFRAN NACELLES, Gonfreville-l'Orcher (FR)

(72) Inventors: Jean-Louis Robert Guy Besse, Moissy-Cramayel (FR); Ye-Bonne Karina Maldonado, Moissy-Cramayel (FR)

(73) Assignees: SAFRAN, Paris (FR); SAFRAN AIRCRAFT ENGINES, Paris (FR); SAFRAN NACELLES, Gonfreville-l'Orcher (FR)

( * ) Notice: Subject to any disclaimer, the term of this patent is extended or adjusted under 35 U.S.C. 154(b) by 424 days.

(21) Appl. No.: 17/414,513

(22) PCT Filed: Dec. 20, 2019

(86) PCT No.: PCT/FR2019/053225
§ 371 (c)(1),
(2) Date: Jun. 16, 2021

(87) PCT Pub. No.: WO2020/128377
PCT Pub. Date: Jun. 25, 2020

(65) Prior Publication Data
US 2022/0111972 A1     Apr. 14, 2022

(30) Foreign Application Priority Data
Dec. 20, 2018   (FR) ...................... 1873646

(51) Int. Cl.
*B64C 11/00*   (2006.01)
*B64D 29/06*   (2006.01)
*B64C 7/02*    (2006.01)

(52) U.S. Cl.
CPC .............. *B64C 11/001* (2013.01); *B64C 7/02* (2013.01); *B64D 29/06* (2013.01)

(58) Field of Classification Search
CPC .......... B64C 7/02; B64C 11/001; B64D 29/08
See application file for complete search history.

(56) References Cited

U.S. PATENT DOCUMENTS 10,752,371 B2 *  8/2020  Cheung ................. B64D 27/24
2006/0284007 A1  12/2006  Hawkins
(Continued)

FOREIGN PATENT DOCUMENTS

| CH | 711721 A2 | 5/2017 |
|---|---|---|
| CN | 107878733 A | 4/2018 |
| WO | 2017/154552 A1 | 9/2017 |

OTHER PUBLICATIONS

Communication about intention to grant a European patent received for European Application No. 19848892.6, dated Jul. 26, 2022, 6 pages.
(Continued)

*Primary Examiner* — Nicholas McFall
(74) *Attorney, Agent, or Firm* — WOMBLE BOND DICKINSON (US) LLP

(57) ABSTRACT

A propulsion system for an aircraft, including at least one rotor and a nacelle cowling extending around the at least one rotor, said nacelle cowling being sectored and including at least one sector, which is fixed and sectors which are retractable in the peripheral direction relative to an axis of rotation of the rotor. The retractable sectors include at least a first series of sectors which are telescopically retractable in or on at least one fixed sector and at least a second series of sectors which are telescopically retractable in or on at least (Continued)

one fixed sector, the at least one fixed sector having an angular extent around the axis which is less than or equal to 90°.

14 Claims, 6 Drawing Sheets

(56) References Cited

U.S. PATENT DOCUMENTS

| | | |
|---|---|---|
| 2008/0277529 A1 | 11/2008 | Marche |
| 2011/0056183 A1 | 3/2011 | Sankrithi et al. |
| 2014/0234090 A1 | 8/2014 | Hurlin et al. |
| 2016/0023754 A1 | 1/2016 | Wiegand |
| 2016/0222917 A1 | 8/2016 | Segat et al. |
| 2018/0079517 A1 | 3/2018 | Peyron et al. |
| 2018/0093754 A1 | 4/2018 | Cheung |

OTHER PUBLICATIONS

Decision to grant a European patent received for European Application No. 19848892.6, dated Oct. 7, 2022, 3 pages.
International Preliminary Report on Patentability received for PCT Patent Application No. PCT/FR2019/053225, dated Jul. 1, 2021, 13 pages (7 pages of English Translation and 6 pages of Original Document).
Office Action, including Search Report received for Chinese Patent Application No. 201980088742.5, dated Apr. 11, 2023, 5 pages (1 page of English Translation and 4 pages of Original Document).
International Search Report received for PCT Patent Application No. PCT/FR2019/053225, dated Mar. 27, 2020, 5 pages (2 pages of English Translation and 3 pages of Original Document).

* cited by examiner

PROPULSION SYSTEM FOR AN AIRCRAFT

TECHNICAL FIELD OF THE INVENTION

The present invention relates to the field of propulsion systems for an aircraft. It relates in particular to a propulsion system with a retractable nacelle fairing.

TECHNICAL BACKGROUND

The prior art comprises in particular the documents CH-A2-711721, US-A1-2006/284007, US-A1-2016/023754 and WO-A1-2017/154552.

A propulsion system for an aircraft comprises at least one rotor or propeller comprising a plurality of blades mounted on a rotating shaft.

There are aircrafts, and in particular Vertical Take-Off and Landing (VTOL), having single-rotor propulsion systems when they comprise a single rotor or counter-rotating when they comprise rotors grouped in pairs rotating in opposite directions.

These propulsion systems are either with ducted rotors (the rotor is then surrounded by an annular nacelle fairing), or with free rotors, the propulsion systems and in particular the rotors (free or ducted) being able to be mounted on a pivot shaft allowing the orientation of the propulsion systems and therefore of the rotors between a vertical position and a horizontal position, for example the vertical orientation for vertical take-off or landing and the horizontal orientation for forward flight or airplane mode.

The ducted rotors have several interesting advantages, such as:
- a significant reduction in the noise signature of the rotor in direct emission;
- a protection of the blades of the rotor from surrounding obstacles;
- an improved rotor performance, in particular in hovering aircraft or at low forward speeds.

In fact, the ducted nacelle provides the rotor additional thrust in hovering flight, during take-off or at low forward speed due to the effect of the ducted nacelle on an air flow downstream of the rotor, in reference to the flow direction of this air flow over the ducted nacelle, also known as a stream tube. More precisely, without the presence of the fairing of the nacelle, with a free rotor, the downstream air flow of the rotor has a natural contraction inwardly. In other words, the diameter of the stream tube decreases downstream until it reaches a diameter equal to half the cross-section of the rotor.

In contrast, for a ducted rotor, the exit section of the fairing of the nacelle defines the shape of the stream tube, i.e. a cylindrical shape at the exit of the fairing of the nacelle with a substantially constant cross-section, thus preventing its natural contraction.

The propulsion balance depends on the exit section of the fairing of the nacelle, so that the larger the exit section of the fairing of the nacelle, the greater the propulsion balance. Indeed, the thrust generated by the presence of the fairing of the nacelle is therefore generated at the leading edge of said fairing, by means of a local depression due to the bypassing of the fairing of the nacelle by the air flow. The greater the air flow rate admitted to the propulsion system, in other words the greater the exit section of the fairing of the nacelle, the greater this depression and, consequently, the greater the thrust generated.

However, at high speeds, the propulsive efficiency of a ducted rotor is reduced. Indeed, as the aircraft's forward speed increases, the performance of the ducted rotor decreases due to the rapid increase of a drag induced by the presence of the fairing of the nacelle. Thus, depending to the rotational speed and size of the rotor, the propulsion efficiency decreases.

Thus, with a ducted rotor, the masking of the noise emission and safety around the perimeter of the rotor are favoured to the detriment of propulsion efficiency in aircraft cruise, i.e. at high forward speed.

On the other hand, for a free-rotor propulsion system (without a nacelle fairing around the rotor), there is no drag induced by a possible fairing of the nacelle, so that when the aircraft's forward speed is high, the propulsion efficiency is optimal, allowing in particular higher flight operating altitudes, or even allowing a higher flight endurance.

However, the absence of a fairing around the rotors induces higher noise emissions and consequently a significant noise nuisance. In addition, the rotor blades are no longer protected, which increases the risk of hitting an obstacle and thus reduces the safety of the rotor, which is in particular risky or harmful when flying close to the ground or a landing structure. Finally, without the presence of a nacelle fairing, the benefit of the thrust effect of the fairing of the nacelle in hovering flight or at low forward speed is also lost for a free rotor.

Thus, the free rotors and fairing rotors have complementary advantages. It is possible to combine the benefits of the thrust effect of the fairing of the nacelle while reducing noise pollution during low forward speed flight or hovering flight by fitting the propulsion system having a nacelle fairing that acts as a screen in line with the rotors, and the benefit of a free-rotor propulsion system with better efficiency for flight phases at higher forward speeds or when the flight environment does not present any constraints in terms of rotor protection or noise pollution.

In the current technology, there are turbomachines with an adjustable cowl upstream of a nacelle fairing surrounding a rotor of the turbomachine (in the direction of flow of an air flow during operation of the turbomachine). This cowl is configured to slide axially with respect to a longitudinal axis of the turbomachine to vary the inlet geometry of the fairing of the nacelle and thereby provide an increased thrust and noise reduction. The cowl comprises a plurality of segments which can be extended radially outwards upstream of the fairing of the nacelle and retracted with respect to the longitudinal axis of the turbomachine, so that at low speeds, during take-offs or landings of an aircraft equipped with such a turbomachine, the cowl is fully extended whereas at high speeds the cowl is fully retracted.

This arrangement, although it is addressing the problem of optimising the acoustics of a rotor and the aerodynamic performance of an aircraft in flight, does not address all the above-mentioned problems, a nacelle fairing is always present around the rotor, thus inducing additional drag at high forward speeds.

It has also been proposed that rotor nacelle fairings for an aircraft can be partially retracted circumferentially around the rotor. Such a nacelle fairing comprises a fixed wall and a movable wall configured to move with respect to the fixed wall so as to partially uncover the rotor, in particular during landing phases of an aircraft, in order to limit a ground clearance of the rotor, the uncovered rotor part directed towards the ground. However, the retraction angular portion of the nacelle fairing remains minor compared to the angular portion of the nacelle fairing which remains fixed around the rotor so that this solution does not address the above-mentioned problems either.

There is therefore a need to provide a simple and effective solution to the above problems.

An objective of the present invention to provide a solution for simple and rapid adaptation of propulsion systems for aircrafts, in order to optimise their aeronautical and acoustic performance, depending on the phases of flight and the environment in which they operate, while ensuring the safety of the rotors.

SUMMARY OF THE INVENTION

The invention relates to a propulsion system for an aircraft, comprising at least one rotor and a nacelle having a fairing extending around said at least one rotor, this nacelle fairing being sectorised and comprising at least one fixed sector and retractable sectors in circumferential direction with respect to an axis of rotation of the rotor characterised in that the retractable sectors comprise at least a first series of retractable sectors which are telescopically retractable into or onto said at least one fixed sector, and at least a second series of sectors which are telescopically retractable into or onto said at least one fixed sector, said at least one fixed sector having an angular extent around said axis which is less than or equal to 90°.

The propulsion system according to the invention thus enables to benefit in a simple and rapid manner, according to the needs of the aircraft, either from a ducted rotor or from a free rotor.

According to an example of an embodiment, the retractable sectors of the first series of sectors are telescopically retractable within each other and within said at least one fixed sector and the retractable sectors of the second series of sectors are telescopically retractable within each other and within said at least one fixed sector.

Advantageously, the retractable sectors are configured so that a triggering of their retraction is dependent on predetermined flight conditions of the aircraft or on a voluntary command from a user.

Advantageously, the retractable sectors have a generally tubular shape and each have transverse dimensions that decrease from one circumferential end to the opposite circumferential end, allowing them to be easily nested in one another in the retracted position while ensuring their telescopic drive during their deployment or retraction. This truncated cone shape also ensures a seal between two adjacent sectors.

Advantageously, each of the series of sectors comprises:
an end sector; and
at least one intermediate sector;
the end sector of the first series of sectors comprising final guiding and locking means configured to cooperate with complementary final guiding and locking means with which the end sector of the second series of sectors is provided for a locking of the nacelle fairing in a closed position.

Thus, the fairing of the nacelle is held in a securely deployed position.

Advantageously, at least some of the sectors comprise sealing means, for example at their circumferential ends, configured to ensure a seal with one or more adjacent sectors.

These sealing means, in addition to ensuring the sealing of the fairing of the nacelle, allow the supply of hot air inside the sectors to ensure de-frosting if necessary.

Advantageously, the propulsion system comprises a device for actuating the deployment and retraction of the sectors of each series, this device comprising a bidirectional slide drive system for the telescopically deployment and retraction of said sectors from or inside or on the fixed sector.

According to an advantageous embodiment, the bidirectional drive system comprises pinions and rack segments set in motion by a same electric motor, the bidirectional system being configured to engage a pinion on at least one rack of the end sector, then, successively, to engage pinions on racks of each intermediate sector, step by step, from the fixed sector in the case of the deployment of the fairing of the nacelle or until the fixed sector in the case of the retraction of the fairing of the nacelle.

Preferably and advantageously, the sectors comprise at least one slide segment having a U-shaped cross-section.

Thus, they can deploy circumferentially ensuring a good deployment of the fairing of the nacelle also circumferentially.

The present invention also relates to a method for commanding a nacelle fairing of a propulsion system for an aircraft according to the invention, from an open position, respectively closed of the fairing of said nacelle, characterized in that the retractable sectors are telescopically deployed, or respectively nested, in circumferential direction, with respect to an axis of rotation of the rotor from, respectively into or onto, said at least one fixed sector.

According to an example for implementing the commanding method according to the invention, deploying the fairing of the nacelle, from an open position of the fairing of the nacelle, comprises the following steps:
detecting a predetermined flight condition in automatic command or a manual command of the closure of the fairing of the nacelle;
sending a request to deploy the sectors to a control and command box;
commanding the bidirectional drive system in extension to deploy the fairing of the nacelle according to a circumferential direction around the rotor from said or each fixed sector;
locking the fairing of the nacelle in the deployed position by the locking means of said or each end sector;
detecting and warning a user of the active locking conditions in the deployed position.

Advantageously, the predetermined flight condition for automatic command of closure of the fairing of the nacelle is a hover phase of the aircraft or a forward speed of the aircraft less than or equal to 180 km/h.

According to another example for implementing the commanding method according to the invention, retracting the fairing of the nacelle, from a closed position of the fairing of the nacelle, comprises the following steps:
detecting a predetermined flight condition in automatic command or a manual command of opening the fairing of the nacelle;
sending a request to retract the sectors to a control and command box;
commanding the bidirectional drive system in contraction to retract the fairing of the nacelle according to a circumferential direction around the rotor until the sectors are completely interlocked in said or each fixed sector;
locking the fairing of the nacelle in the retracted position;
detecting and warning a user of the active locking conditions in the retracted position.

Advantageously, the predetermined flight condition for automatic command of opening of the fairing of the nacelle is a forward speed of the aircraft greater than 180 km/h.

As mentioned above, the passage of a free-rotor or a ducted-rotor propulsion system is simple, fast and secure.

Finally, the present invention relates to an aircraft characterised in that it comprises at least one propulsion system having any of the above-mentioned characteristics, the propulsion system being mounted so as to pivot on the aircraft by means of a pivot shaft that is offset from the rotor or passes through the rotor.

In this way, the aircraft can easily switch from a conventional mode to a vertical take-off and landing mode, thus easily adapting to the environment in which it is intended to operate.

BRIEF DESCRIPTION OF THE FIGURES

Other characteristics and advantages of the invention will become apparent in the course of the following detailed description, for the understanding of which reference is made to the attached drawings in which.

DETAILED DESCRIPTION OF THE INVENTION

In this disclosure, the terms "distal" and "proximal" are used in reference to the positioning of the sectors of each set with respect to the fixed sector of that set. The terms "internal" and "external" are used in reference to the constituent parts of each sector.

A propulsion system generally consists of:
a nacelle;
an engine and its command and control system;
and, in the case of a propeller or rotor propulsion, its propeller or rotor(s).

The nacelle is the element that allows the engine to be integrated into the aircraft and is made up of:
fairings (allowing the engine to be cowled, fairing the rotors, capturing the flowing of air during operation of the aircraft, creating a thrust effect, reversing the thrust on turbojet engines, etc.);
equipment to be mounted on the engine (such as the Engine Build-up Unit EBU, which represents the electrical, hydraulic and pneumatic networks); and
systems for attachment to the aircraft.

FIGS. 1 to 4 illustrate, in a simplified manner, a first embodiment of an aircraft propulsion system 100 according to the invention.

Figure 1:
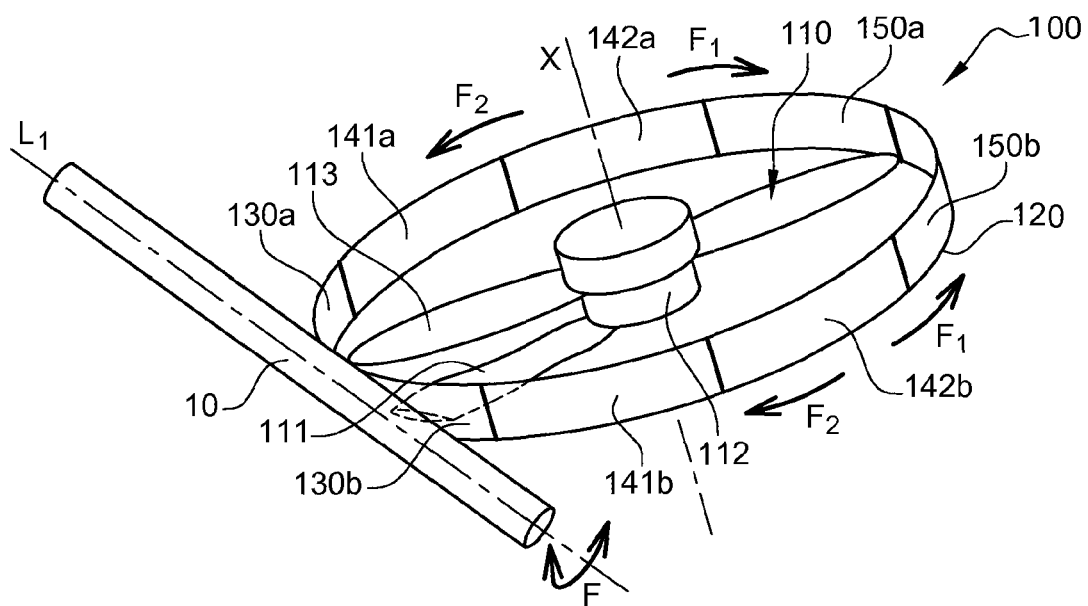
FIG. 1 is a schematic perspective view of a first embodiment of the propulsion system according to the invention, shown with a nacelle fairing in the deployed position, the propulsion system being in the horizontal position.
Figure 2:
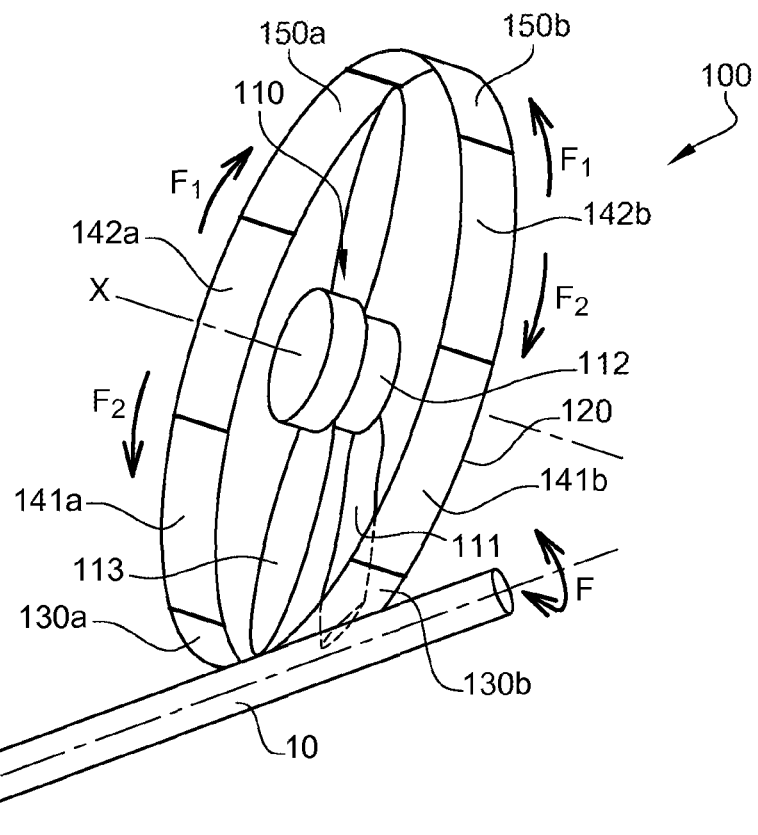
FIG. 2 is a view similar to FIG. 1, showing the propulsion system in a vertical position.
Figure 3:
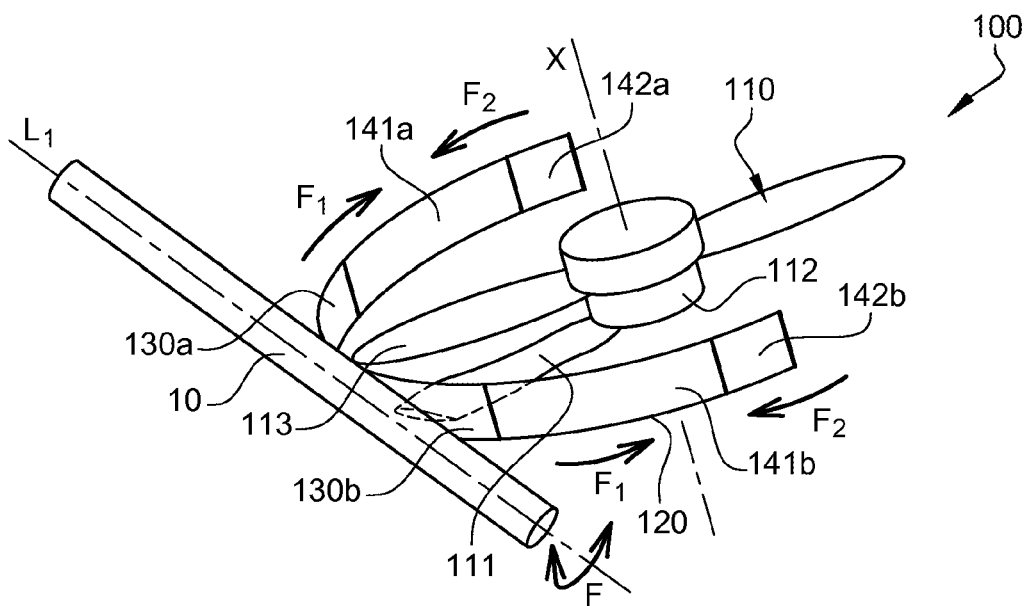
FIG. 3 is a view similar to FIG. 1, showing the fairing of the nacelle being retracted.

The propulsion system 100 here comprises at least one rotor 110 and a nacelle fairing 120 extending around said at least one rotor 110. The propulsion system 100 may be fixedly mounted on the aircraft 1. Alternatively, the propulsion system 100 may be mounted on a pivot shaft 10, offset from an axis of rotation X of the rotor 110. The pivot shaft 10 is fixed by any means to the propulsion system 100, on the one hand, and to the aircraft 1, on the other hand, and allows the orientation of the propulsion system 100 on the aircraft 1, authorising the tilting of the propulsion system 100 about a longitudinal axis L1 of the pivot shaft 10, according to the arrow F, by means of known actuators, between a horizontal position such as illustrated in FIG. 1, and a vertical position such as illustrated in FIG. 2. This tilting allows the aircraft 1 to be switched from a conventional mode as for an airplane, to a VTOL or helicopter mode.

The rotor 110 of the propulsion system 100 is connected to the aircraft 1 by a mast 111 supporting a motor 112, for example an electric motor, driving the rotor 110 in rotation via a power shaft, in a manner known per se. According to the illustrated example, which is not limiting, each rotor 110 comprises two blades 113.

The fairing 120 of the nacelle is sectorised into a plurality of sectors. According to the example illustrated in FIGS. 1 to 4, the fairing 120 of the nacelle is sectorised into eight sectors divided into two series, the sectors relating to a first series of sectors will be designated by the letter "a" and the sectors relating to a second series of sectors will be designated by the letter "b".

Thus, the fairing 120 of the nacelle comprises:
two fixed sectors 130a, 130b;
four intermediate sectors 141a, 142a, 141b, 142b; and
two end sectors 150a, 150b.

The sectors are thus grouped in series, a first series comprising a fixed sector 130a, two intermediate sectors 141a, 142a and an end sector 150a and a second series comprising a fixed sector 130b, two intermediate sectors 141b, 142b and an end sector 150b. The first series and the second series are configured to cooperate together to form the fairing 120 of the nacelle.

The fairing 120 of the nacelle of the propulsion system 100 may be mounted directly on a wing section or fuselage of the aircraft 1, or on the pivot shaft 10, via its fixed sectors 130a, 130b.

The intermediate sectors and the end sectors are retractable in the circumferential direction with respect to the axis of rotation X of the rotor 110. More specifically, according to a first example embodiment, the end sector 150a is telescopically retractable within the distal intermediate sector 142a, which itself is telescopically retractable within the proximal intermediate sector 141a, which itself is telescopically retractable within the fixed sector 130a. Similarly, the end sector 150b is telescopically retractable within the distal intermediate sector 142b, which itself is telescopically retractable within the proximal intermediate sector 141b, which itself is telescopically retractable within the fixed sector 130b.

According to another example embodiment (not shown), the sectors are retractable onto each other and onto the fixed sector. That is, the end sector 150a is telescopically retractable onto the distal intermediate sector 142a, which itself is telescopically retractable onto the proximal intermediate sector 141a, which itself is telescopically retractable onto the fixed sector 130a. Similarly, the end sector 150b is telescopically retractable onto the distal intermediate sector 142b, which itself is telescopically retractable onto the proximal intermediate sector 141b, which itself is telescopically retractable onto the fixed sector 130b.

In the following, the retraction is shown (with reference to the drawings) according to the embodiment in which the retractable sectors are configured to be telescopically retracted, into each other, from the more distal to the more proximal and then into the fixed sector, without being limiting.

It could be envisaged to have only one fixed sector 130ab common to the "a" and "b" series instead of the two fixed sectors 130a and 130b, the fairing 120 of the nacelle then being sectorised into seven sectors.

Figure 4:
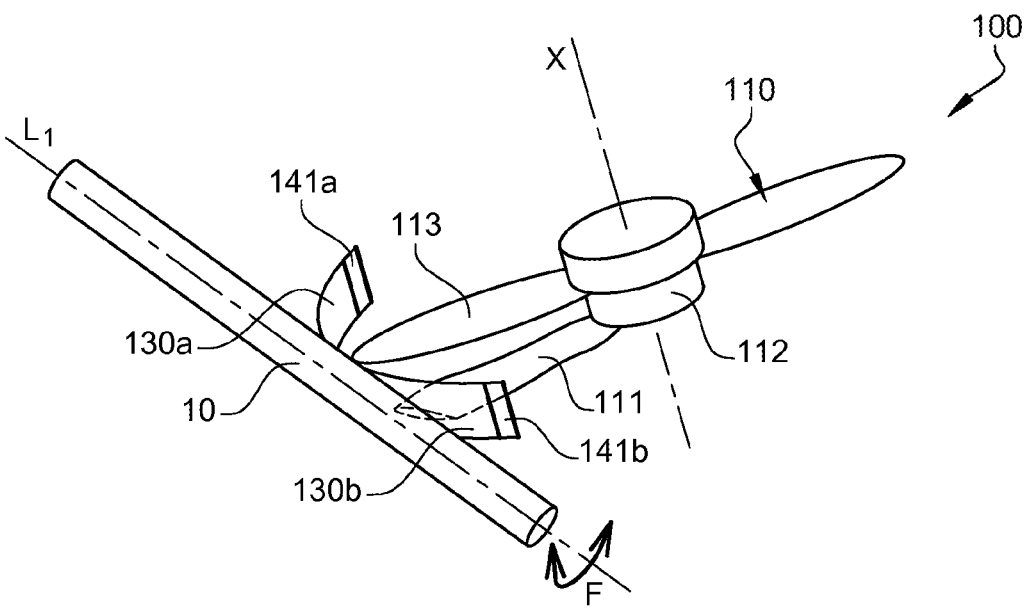
FIG. 4 is a view similar to FIG. 1 in which the fairing of the nacelle is almost fully retracted.

Thus, the fairing 120 of the nacelle can move from a fully deployed position around the rotor as illustrated in FIGS. 1 and 2, to a fully retracted position as illustrated in FIG. 4, the rotor 110 then being comparable to a free rotor. Indeed, in this example, the sum of the angular extents of the fixed sectors 130a, 130b around the axis X of rotation of the rotor 110 is less than or equal to 90° so that in the retracted position of the fairing 120 of the nacelle, the rotor 110 of the propulsion system 100 is assimilated to a free rotor.

Figure 5:
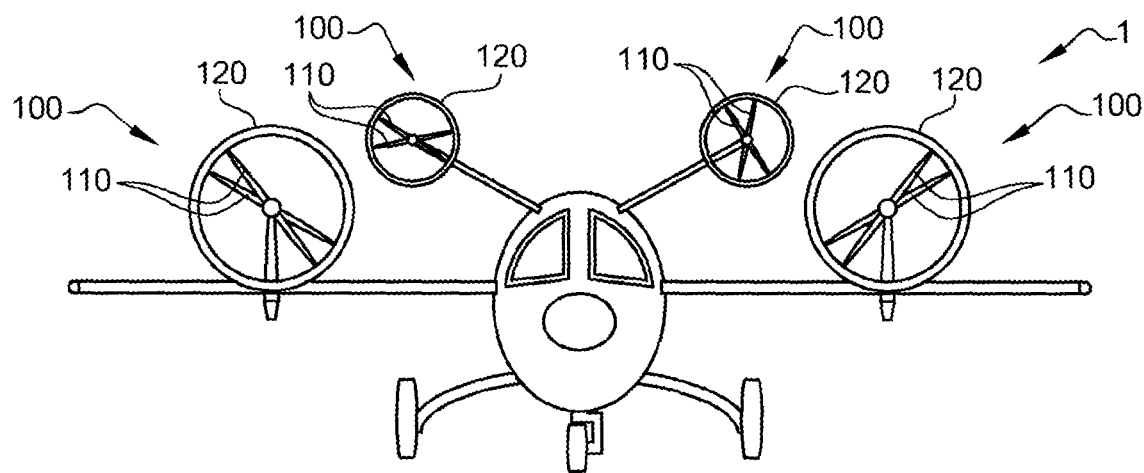
FIG. 5 is a schematic view of an aircraft equipped with propulsion systems according to the invention in which the nacelles are shown with their fairings in a deployed position around the rotors.
Figure 6:
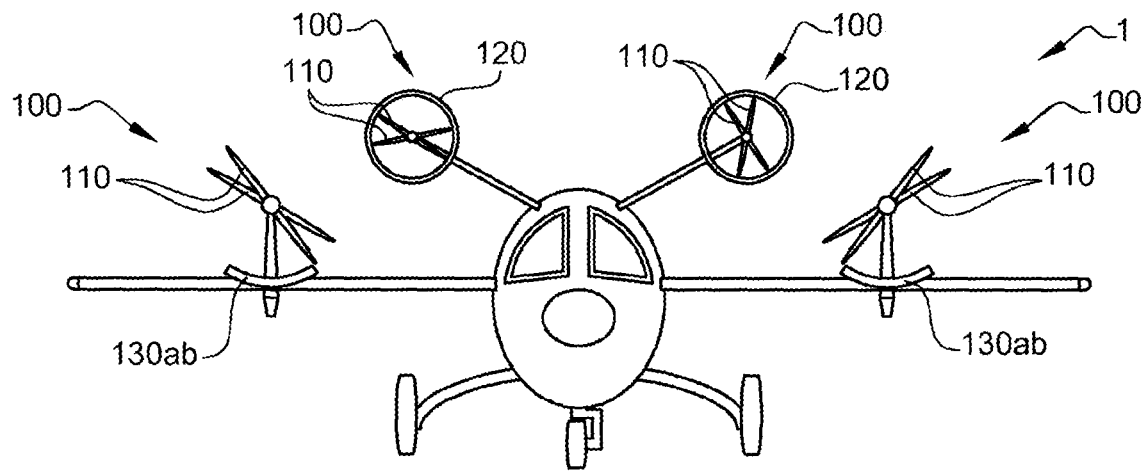
FIG. 6 is a view similar to FIG. 5 in which some nacelles are shown with their fairing in retracted position and others are shown with their fairing in deployed position.

FIGS. 5 and 6 illustrate an aircraft 1 comprising four propulsion systems 100 with double counter-rotating rotors 110. With reference to FIG. 5, the propulsion systems 100 are all shown with a nacelle fairing 120 fully deployed around the rotors 110. With reference to FIG. 6, two propulsion systems 100 are shown with a nacelle fairing 120 still fully deployed around their respective rotors 110, while two other propulsion systems 100 are shown with a nacelle fairing 120 whose retractable sectors are fully retracted within the fixed sectors 130ab.

The aircraft 1 is shown here in the conventional mode, i.e. in the translational flight mode or "airplane" mode. However, the pivot shaft 10 allows the aircraft 1 to enter a VTOL (vertical flight mode), thereby providing lift to the aircraft.

In the examples shown, some of the propulsion systems 100 are mounted on the suction side of the wings of the aircraft 1. However, these propulsion systems could also be mounted on the pressure side of the wings of the aircraft 1.

Figure 7:
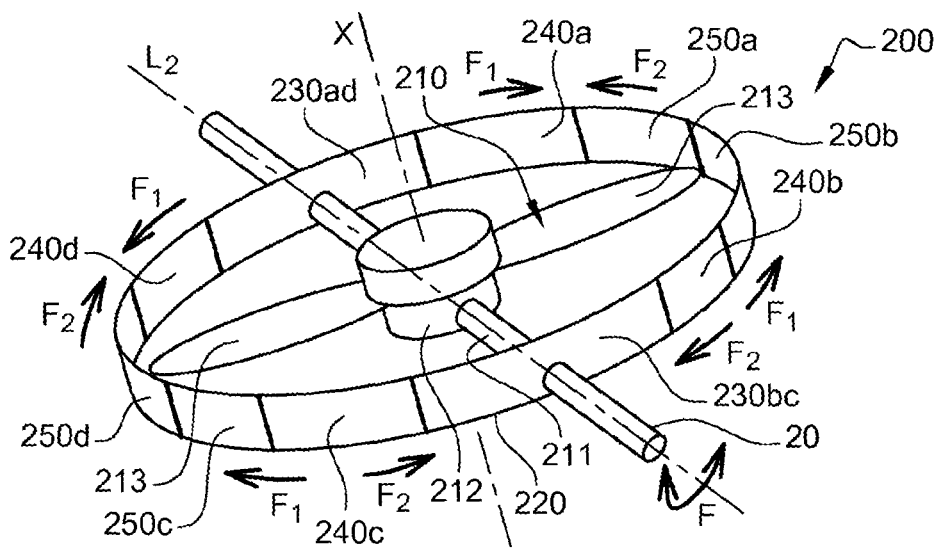
FIG. 7 is a schematic perspective view of a second embodiment of the propulsion system according to the invention, shown with a nacelle with a fairing in the deployed position, the propulsion system being shown in a horizontal position.
Figure 8:
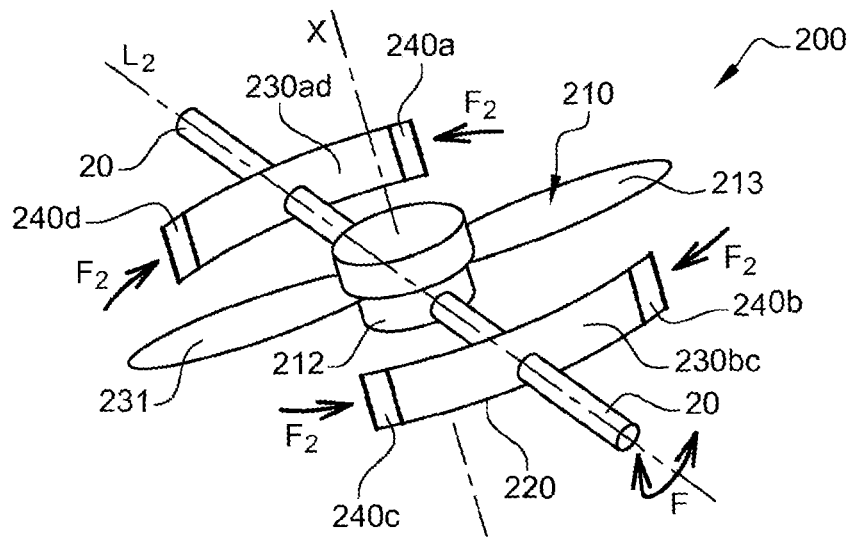
FIG. 8 is a view similar to FIG. 7 in which the fairing of the nacelle is almost completely retracted.

FIGS. 7 and 8 illustrate a second embodiment of an aircraft propulsion system 200 according to the invention.

Similar to the first embodiment, the propulsion system 200 here comprises at least one rotor 210 and a nacelle fairing 220 extending around said at least one rotor 210. The propulsion system 200 may be fixedly mounted to the aircraft. Alternatively, the propulsion system 200 may be mounted on a pivot shaft 20, passing through the rotor 210 perpendicular to an axis of rotation X of the rotor 210. The pivot shaft 20 is fixed by any means to the propulsion system 100, on the one hand, and to the aircraft, on the other hand, and allows the orientation of the propulsion system 200 on the aircraft, allowing the tilting of the propulsion system 200 about a longitudinal axis L2 of the pivot shaft 20, according to the arrow F, by means of known actuators, between a horizontal position such as illustrated in FIG. 7 or 8, and a vertical position (not shown). This tilting allows the aircraft to be switched from a conventional mode as for an airplane, to a VTOL or helicopter mode.

The rotor 210 of the propulsion system 200 is connected to the aircraft by a mast 211 supporting a motor 212, for example an electric motor, driving the rotor 210 in rotation via a power shaft, in a manner known per se. According to the illustrated example, the mast 211 of the rotor 210 is merged with the pivot shaft 20. According to the illustrated example which is not limiting, each rotor 210 comprises two blades 213.

The fairing 220 of the nacelle is sectorised into a plurality of sectors. According to the example illustrated in FIGS. 7 and 8, the fairing 220 of the nacelle is sectorised into ten sectors divided into four series, designated by the letters "a", "b", "c" and "d".

Thus, the fairing 220 of the nacelle comprises:
two fixed sectors 230ad, 230bc;
four intermediate sectors 240a, 240b, 240c and 240d; and
four end sectors 250a, 250b, 250c and 250d.

The sectors are thus grouped in series, a first series comprising a portion of the fixed sector 230ad, an intermediate sector 240a and an end sector 250a; a second series comprising a portion of the fixed sector 230bc, an intermediate sector 240b and an end sector 250b; a third series comprising a portion of the fixed sector 230bc, an intermediate sector 240c and an end sector 250c and a fourth series comprising a portion of the fixed sector 230ad, an intermediate sector 240d and an end sector 250d. The four series are configured to cooperate in pairs so as to form the fairing 220 of the nacelle.

In this embodiment, the fixed sector 230ad is common to the series of sectors "a" and "d" and the fixed sector 230bc is common to the series of sectors "b" and "c". It could be envisaged that each series has its own fixed sector, the fairing 220 of the nacelle being then sectorised into twelve sectors.

The fairing 220 of the nacelle of the propulsion system 200 may be mounted directly on a wing section or fuselage of an aircraft, or on the pivot shaft 20, via its fixed sectors 230ad, 230bc.

The intermediate sectors and the end sectors are retractable in a circumferential direction with respect to an axis of rotation X of the rotor 210. More specifically, according to a first non-limiting embodiment, the end sector 250a is telescopically retractable within the intermediate sector 240a which itself is telescopically retractable within the fixed sector 230ad. Similarly, the end sector 250b is telescopically retractable within the intermediate sector 240b, which itself is telescopically retractable within the fixed sector 230bc; the end sector 250c is telescopically retractable within the intermediate sector 240c which itself is telescopically retractable within the fixed sector 230bc; and the end sector 250d is telescopically retractable within the intermediate sector 240d which itself is telescopically retractable within the fixed sector 230ad.

As mentioned above, another embodiment is envisaged, but not shown, in which the retractable sectors 250a-240a and 250d-240d, respectively 250b-240b and 250c-240c, are telescopically retracted onto the fixed sectors 230ad, respectively 230bc.

Thus, the fairing 220 of the nacelle can move from a fully deployed position around the rotor as shown in FIG. 7, to a fully retracted position as shown in FIG. 8, the rotor 210 being then comparable to a free rotor. Indeed, in this example, the sum of the angular extents of the fixed sectors 230ad, 230bc around the axis X of rotation of the rotor 210 is less than or equal to 90° so that in the retracted position of the fairing 220 of the nacelle, the rotor 210 of the propulsion system 200 is assimilated to a free rotor.

For ease of understanding, in the remainder of this discussion common to the two above-mentioned embodiments, the fixed sectors will be designated by reference 30, the intermediate sectors will be designated by reference 40 and the end sectors will be designated by reference 50.

The number of sectors constituting the fairing 120, 220 of the nacelle can be chosen according to aerodynamic and mechanical constraints.

Figure 9A:
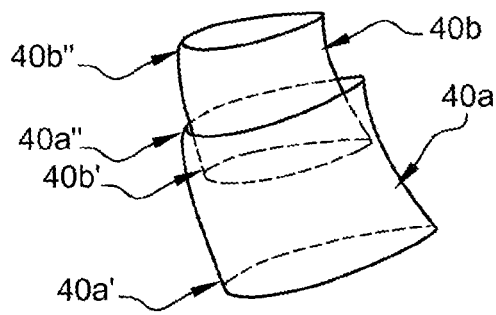
FIG. 9a is a schematic view showing the nesting of two adjacent sectors of the fairing of the nacelle.
Figure 9B:
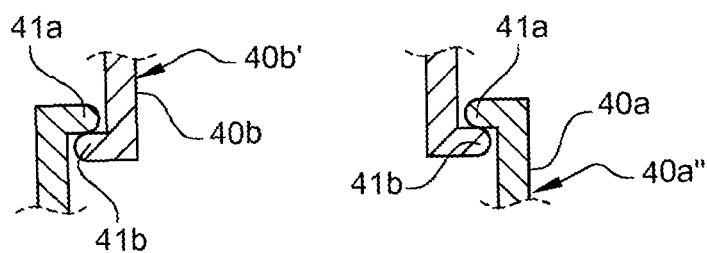
FIG. 9b is a schematic, non-dimensional cross-sectional detail view showing the drive beads of two adjacent sectors of the fairing of the nacelle.
Figure 10:
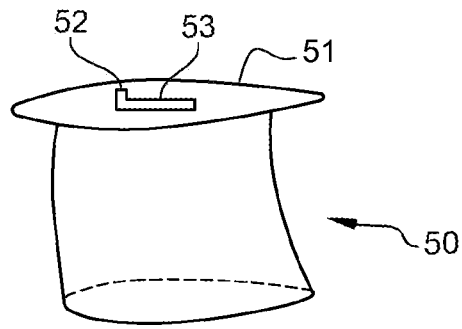
FIG. 10 is a schematic detail view of an example of the end sector.

FIGS. 9a, 9b and 10 illustrate retractable sectors. More specifically, FIG. 9a shows two intermediate sectors 40a, 40b, FIG. 9b is a detail view of FIG. 9a and FIG. 10 shows an end sector 50.

As already stated, the figures illustrate the embodiment in which the retractable sectors 50, 40a, 40c are configured to be retracted one inside the other, from the most distal to the most proximal, and into the fixed sector 30. However, the features detailed below may be adapted to the embodiment in which the retractable sectors are configured to be retracted one on top of the other, from the most distal to the most proximal, and onto the fixed sector.

The intermediate retractable sectors 40a, 40b and end sector 50, as well as the fixed sector 30, are generally tubular in shape (thus having an internal cavity) with a longitudinal major axis and cross-sections.

The sectors 30, 40a, 40b and 50 each have transverse dimensions which decrease from a circumferential end, known as the proximal 30', 40a', 40b', 50', to an opposite circumferential end, known as the distal 30", 40a", 40b", 50". In other words, a section of the proximal circumferential end 30", 40a", 40b", 50" of the sectors 30, 40a, 40b, 50 has larger dimensions than a section of the distal circumferential end 30', 40a', 40b', 50' of the sectors 30, 40a, 40b, 50, thus giving them a truncated cone shape allowing them to be easily nested in one another in the retracted position. Respectively, in the embodiment where the retractable sectors nest on each other and on the fixed sector, the sectors each have transverse dimensions which decrease from a circumferential end, called the distal end, to an opposite circumferential end, called the proximal end, thus giving them a truncated cone shape allowing them to nest easily on each other in the retracted position.

To allow this nesting, each sector has dimensions smaller than the dimensions of the sector into which it is to be nested. Respectively, each sector has dimensions greater than the dimensions of the sector into which it is to be nested. For example, according to the first embodiment, the distal intermediate sector 40b has smaller dimensions than the proximal intermediate sector 40a. As the retractable sectors 40a, 40b, 50 are all intended to be nested in the fixed sector 30, this fixed sector 30 is therefore the one with the largest dimensions in order to contain all the other sectors in the retracted position. And the end sector 50 is therefore the sector with the smallest dimensions.

The truncated cone shape of the sectors 30, 40a, 40b and 50 ensure their telescopic drive during their deployment or retraction. Telescopic means that each distal sector nests, respectively extends, in an adjacent proximal sector, respectively from an adjacent proximal sector, by sliding the distal sector into the proximal sector, respectively by sliding the distal sector out of the proximal sector.

The circumferential ends of each sector have a bead (FIG. 9b) ensuring that two adjacent sectors are joined together during the deployment and retraction operations of the fairing 120, 220 of the nacelle. For example, the intermediate sector 40a has, on an internal surface, at its distal circumferential end 40a", an annular bead 41a and the intermediate sector 40b has, on an external surface, at its proximal circumferential end 40b', an annular bead 41b, the bead 41a of the sector 40a being capable of cooperating with the bead 41b of the sector 40b to ensure that the sectors 40a, 40b are joined together during the operations of deploying and retracting the fairing 120, 220 of the nacelle. This connection may be achieved by any other suitable means.

The retractable sectors 40a, 40b, 50 are configured so that the triggering of their deployment or retraction is dependent on the flight conditions of the aircraft 1 or on a voluntary action by a user by command, as will be described below.

The truncated cone shape of the sectors 30, 40a, 40b and 50 also ensures the sealing between two adjacent sectors.

Advantageously, the sectors 30, 40a, 40b and 50 have an aerodynamic profile adapted to a flow of an air flow during operation of the propulsion system 100, 200.

The sectors 30, 40a, 40b and 50 constitute an angular portion of a fairing 120, 220 of a ring-shaped nacelle, they also have a curved shape.

The sectors 30, 40a, 40b and 50 are made of a structural material having the necessary strength, such as, for example, an aluminium alloy or a carbon fibre composite. Advantageously, the structure constitute the sectors 30, 40a, 40b and 50 may also have acoustic emission absorption characteristics in order to reduce the noise of the rotor 110, 210 when the fairing 120, 220 of the nacelle is deployed.

The end sector 50 has, at a distal end, a plate 51 configured to abut a plate of an end sector of another set of sectors to ensure contact of two sets of sectors when the fairing 120, 220 of the nacelle is deployed. In order to guide the end sectors 50 of two series when they come into contact at the end of deployment, each end sector 50 may also comprise a terminal guiding device 52. For example, this guiding device 52 may comprise a pin carried by the end sector 50 of one of the series, configured to cooperate with a notch carried by the end sector 50 of the other of the series.

The end sector 50 of the first series of sectors also comprises locking means 53 configured to cooperate with complementary locking means with which the end sector of the second series of sectors is provided, such as, for example, an electrically controlled electromechanical latch, for locking the fairing of the nacelle in the closed position and also improving the sealing and aerodynamics of the fairing 120, 220 of the nacelle.

However, this embodiment implies the presence of wired cabling inside the fairing 120, 220 of this nacelle for which it is necessary to provide a system of winding or unwinding at the same time as the deployment and retraction movements of the fairing 120, 220 of the nacelle, or to provide an electrical track set directly applied in the constituent elements of the fairing 120, 220 of the nacelle (such as, for example, the racks which will be described below).

In this way, another preferred embodiment of the locking means 53 is a mechanical latch for which the application of a first pressure allows the locking and the application of a second pressure allows unlocking.

For obvious safety reasons, it is desirable to be able to ensure that the fairing 120, 220 of the nacelle is correctly locked in the deployed position. In this way, the propulsion system 100, 200 may also comprise a control device to ensure that the fairing 120, 220 of the nacelle is correctly locked in the deployed position, such as, for example, an analogue switch. This control device may advantageously be configured to warn a user or a computer of the active locking of the fairing 120, 220 of the nacelle in the deployed position. Similarly, if the analogue switch detects an incorrect locking of the fairing 120, 220 of the nacelle in the deployed position, a warning (e.g. by means of an audible device or an indicator light) could be sent to a user of the aircraft, for example on a dashboard of the aircraft cockpit.

To further improve the sealing of the fairing of the nacelle, and in particular the sealing between two adjacent sectors, at least some of the sectors 30, 40a, 40b and 50 are further provided with sealing means (not shown), for example at their circumferential ends.

These sealing means are, for example, brush seals arranged on an external surface of each sector 30, 40a, 40b and 50 at their circumferential ends and configured to cooperate with an internal surface of each sector 30, 40a, 40b and 50 brought to face these brush seals during deployment or retraction of the fairing 120, 220 of the nacelle. This solution is preferred because, in addition to allowing the sealing with one or more adjacent sectors, these brush seals do not prevent the supply of hot air to the internal cavity of the tubular sectors 30, 40a, 40b and 50, to allow their de-icing if necessary.

Alternatively, the sealing could be achieved by any other means, or by precise adjustment of the sectors 30, 40a, 40b and 50, although this is not preferred.

In order to allow the telescopic deployment of the sectors 30, 40a, 40b and 50 or the retraction by successive nesting of the sectors 30, 40a, 40b and 50 in pairs, each series of sectors 30, 40a, 40b and 50 is provided with a device for actuating such as a bidirectional drive system 2 with a rack-and-pinion cylinder. FIGS. 11 to 15 illustrate the details of such a bidirectional drive system, for a fairing 120, 220 having eight sectors divided into two series of four sectors 30, 40a, 40b, 50, in this example.

The bidirectional drive system 2 comprises a plurality of pinions 3a, 3b, 3c and a plurality of rack segments 4a, 4b, 4c integral, respectively, with slide segments 6a, 6b, 6c.

The rack and pinion pairs are set in motion by a single electric motor 5.

Figure 11:
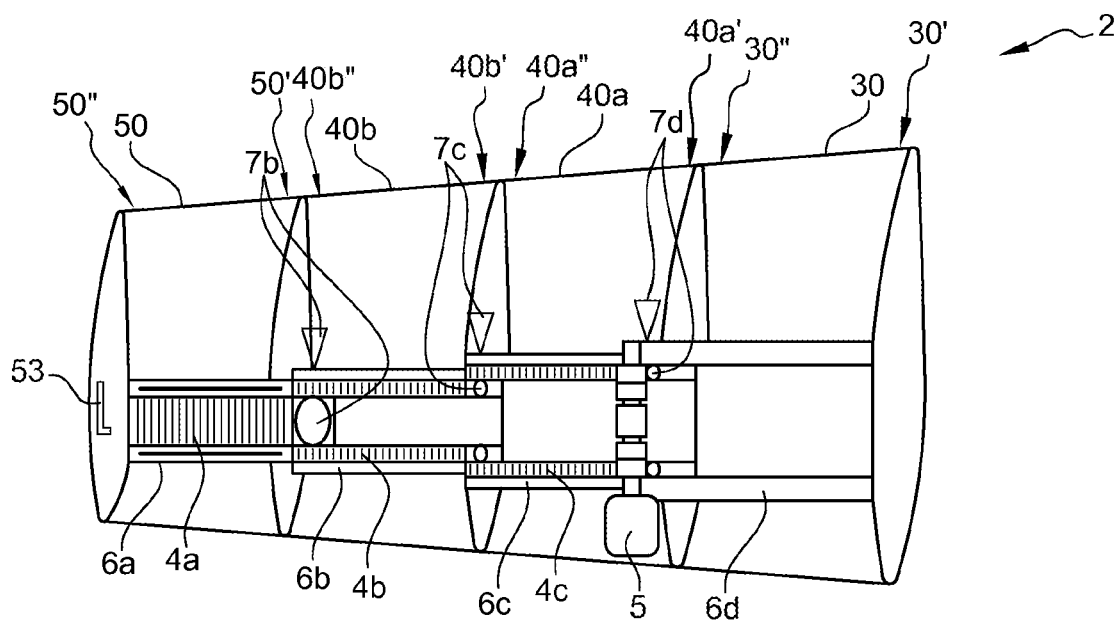
FIG. 11 is a schematic detail view showing a set of sectors of the fairing of the nacelle and their drive system according to the invention.
Figure 12:
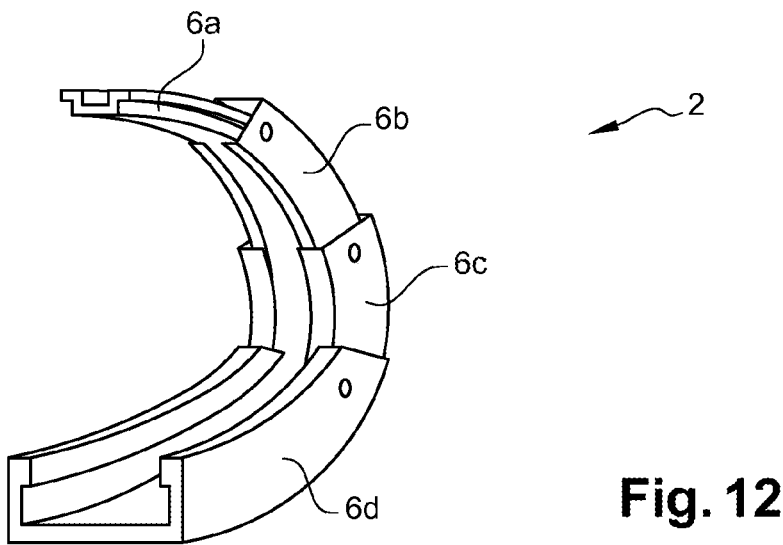
FIG. 12 is a perspective view showing a set of slide segments of the drive system according to the invention in deployed position.
Figure 13:
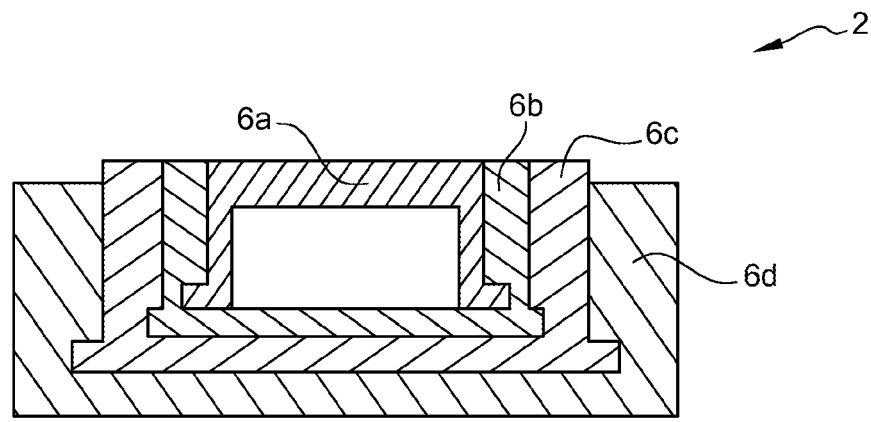
FIG. 13 is a partial cross-section and front detail view showing the slide segments of the drive system according to the invention in the retracted position.
Figure 14:
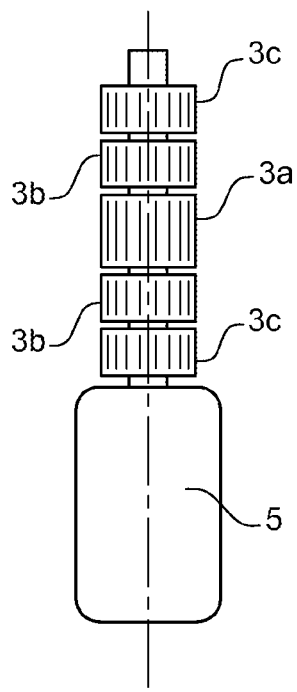
FIG. 14 is a detail view illustrating the backlash adjusting pinion system of the drive system shown in FIG. 11.
Figure 15:
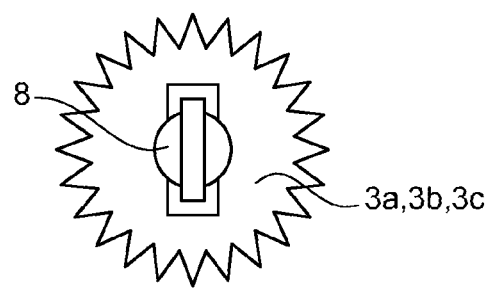
FIG. 15 is a detail view illustrating the toothing offset adjustment device of the rack/pinion system according to the invention.

As can be seen in FIGS. 11 and 14, the rack 4a of the end sector 50 is a single toothing designed to cooperate with a unique pinion 3a. On the other hand, the rack 4b of the distal intermediate sector 40a is double toothing and is intended to cooperate with two pinions 3b. Similarly, the rack 4c of the proximal intermediate sector 40b has double toothing and is intended to cooperate with two pinions 3c.

The bidirectional drive system 2 is configured to extend into the internal cavities of the tubular sectors 30, 40a, 40b and 50. The slide segment 6a is associated with the end sector 50. The slide segment 6b is associated with the distal end sector 40a. The slide segment 6c is associated with proximal end sector 40b. A final slide segment 6d is associated with the fixed sector 30. However, several slide segments could be assigned to the same sector.

As can be seen in FIG. 11, the slide segments 6a, 6b, 6c, 6d are concentric. They have a U-shaped cross-section and are curved so as to follow the curved shape of the sectors 30, 40a, 40b and 50. The slide segments 6a, 6b, 6c, 6d are dimensioned and configured to nest together in pairs by sliding into each other.

The slide segments 6a, 6b, 6c, 6d can advantageously be dimensioned to ensure mechanical strength of the fairing 120, 220 in all its configurations when it is subjected to aerodynamic, gravitational and dynamic forces.

Advantageously, the surfaces of these slide segments in relative movement with respect to each other may be coated with a self-lubricating coating in order to prevent the risks of jamming or excessive wear.

The rack segments 4a, 4b, 4c are sized and configured to be slidably nested in pairs, similar to the sectors 30, 40a, 40b and 50.

The bidirectional system 2 is sized and configured to avoid any risk of contact with the rotors 110, 210 during deployment or retraction of the fairing 120, 220 of the nacelle.

The bidirectional system 2 is configured to drive the pinions 3a, 3b and 3c which are integral in rotation with the electric motor 5 via the same shaft. The pinion 3a of the end sector 50 engages on the rack segment 4a to drive the associated slide segment 6a, and then, successively, the pinions of each intermediate sector 40a, 40b, step by step, from the most distal to the most proximal, from the fixed sector 30 in the case of the deployment of the fairing 120, 220 of the nacelle or to the fixed sector 30 in the case of the retraction of the fairing 120, 220 of the nacelle. In other words, the pinion 3b of the distal intermediate sector 40b engages the rack segment 4b to drive the associated slide segment 6b, and then the pinion 3c of the proximal intermediate sector 40a engages the rack segment 4c to drive the associated slide segment 6c.

The slide segment 6d associated with the fixed sector 30 is not coupled to any rack or pinion and remains immobile.

The bidirectional drive system 2 further comprises means for locking 7b, 7c, 7d in the deployed position of the slide segments 6a, 6b, 6c and, consequently, the retractable sectors 40a, 40b, 50. These locking means comprise, for example, mechanical means comprising two elements configured to cooperate (of the cam and pawl or pin and notch type) and are arranged, for one of the elements, at a proximal end of the rack segments 4a, 4b, 4c and, for the other of the elements, at a distal end of the slide segments 6b, 6c, 6d, thus making it possible to mechanically secure or release the rack segments associated with adjacent sectors. This locking means 7b, 7c, 7d may also be of the electromechanical type.

The deployment and retraction of the slide segments 6a, 6b, 6c and thus of the sectors 30, 40a, 40b, 50 is carried out sequentially by successive locking of adjacent segments by the locking devices 7b, 7c, 7d.

Thus, when the sectors 30, 40a, 40b, 50 are deployed around the rotors 110, 210, the electric motor 5 rotates in a first direction and drives all the pinions 3a, 3b, 3c in rotation. Initially, the pinion 3a engages the toothing of the rack segment 4a to drive the associated slide segment 6a off the slide segment 6b until the slide segment 6a is secured to the slide segment 6b by the locking means 7b. Then, the pinions 3b engage on the toothing of the rack segment 4b to drive the secured slide segments 6a and 6b and in particular drive the slide segment 6b off the slide segment 6c, until the slide segment 6b is secured to the slide segment 6c by the locking means 7c. And finally, the pinions 3c engage on the toothing of the rack segment 4c to drive the secured slide segments 6a, 6b and 6c and in particular drive the slide segment 6c off the slide segment 6d, until the slide segment 6c is secured to the slide segment 6d by the locking means 7d.

Similarly, when the sectors 30, 40a, 40b, 50 are retracted around the rotors 110, 210, the electric motor 5 rotates in a second direction opposite to the first direction and drives all the pinions 3a, 3b, 3c in rotation. Initially, the locking means 7d is unlocked and the pinions 3c engage on the toothing of the rack segment 4c to drive the slide segments 6a, 6b and 6c connected by the locking means 7b and 7c, until the slide segment 6c is retracted into the slide segment 6d. Subsequently, the locking means 7c is unlocked and the pinions 3b engage the toothing of the rack segment 4b to drive the slide segments 6a and 6b secured by the locking means 7b, until the slide segment 6b is retracted into the slide segment 6c. And finally, the locking means 7b is unlocked and the pinion 3a engages the toothing of the rack segment 4a for driving the slide segment 6a until the slide segment 6a is retracted into the slide segment 6b.

Advantageously, the pinions 3a, 3b, 3c may comprise a toothing offset adjustment system 8 known per se, which enables to have only one rotation shaft for all the pinions 3a, 3b and 3c. For example, the toothing offset adjustment system 8 comprises pins that abut in grooves provided in the pinions 3a, 3b and 3c.

The deployment and retraction of the sectors around the rotors 110, 210 could also be achieved by other methods, such as by means of dedicated pneumatic systems.

Thus, the deployment of the fairing 120, 220 of the nacelle of a propulsion system 100, 200 from a position of opening the fairing 120, 220 of the nacelle (i.e. when the retractable sectors 40a, 40b and 50 of the fairing 120, 220 of the nacelle are fully nested in the fixed sectors 30) can be commanded either manually or automatically, by detection of a predetermined flight condition requiring the propulsion system 100, 200 to be switched from a free-rotor configuration to a ducted-rotor configuration. Indeed, if the noise nuisance needs to be reduced because the aircraft 1 is flying over a residential area or an environment comprising of obstacles that may present a risk to the rotors, a user may manually activate the deployment of the fairing 120, 220 of the nacelle. In automatic mode, the deployment of the fairing 120, 220 of the nacelle may be triggered if a hover phase is detected, i.e., if the aircraft 1 is stationary in the air, lifting without support or backing, or when a low forward speed of the aircraft 1 is detected, meaning that a thrust effect of the fairing of the nacelle should be preferred. The closing of the fairing 120, 220 of the nacelle can be triggered in automatic mode if the forward speed of the aircraft 1 is less than or equal to 180 km/h.

Thus, when such a manual control or when such a condition is detected, a request to deploy the sectors 40a, 40b and 50 is sent to a control and command box which commands the bidirectional drive system 2 in extension to deploy the fairing 120, 220 of the nacelle.

The pinion-rack pairs 3a-4a, 3b-4b and 3c-4c are set in motion as described above.

Consequently, the sectors 40a, 40b, 50 are deployed according to a circumferential direction around the rotor 110, 210 (in the direction of the arrows F1 in FIGS. 1 to 4 and 7 and 8) starting with the end sector 50 which slides off the distal intermediate sector 40a, then the distal intermediate sector 40a slides off the proximal intermediate sector 40b and finally the proximal intermediate sector 40b slides off the fixed sector 30.

The retractable sectors thus deploy until they come into contact with the end sectors 50 of each series of sectors configured to cooperate in pairs. At the end of the deployment stroke, the guiding means 52 of the end sectors 50 guide the latter to bring their respective plate 51 opposite each other. The locking means 53 of each end sector 50 are then actuated to lock the fairing 120, 220 of the nacelle in the closed position. The rotor 110, 210 is then a ducted rotor.

Similarly, the retraction of the fairing 120, 220 of the nacelle of a propulsion system 100, 200 from a closed position of the fairing 120, 220 of the nacelle (i.e. when the fairing of the nacelle is fully deployed around the rotor 110, 210) may be commanded either manually or automatically, by detection of a predetermined flight condition requiring the propulsion system 100, 200 to be switched from a ducted rotor configuration to a free-rotor configuration, for example, when a high forward speed of the aircraft 1 is detected, meaning that a propulsive efficiency of the rotors must be preferred. According to an example embodiment, the retraction or opening of the fairing 120, 220 of the nacelle may be triggered in automatic mode if the forward speed of the aircraft 1 is above 180 km/h.

Thus, when such a manual command or when such a condition is detected, the locking means 53 of the end sectors 50 are unlocked to allow the separation of the series of sectors previously linked by their respective end sector 50. A request to retract the sectors 40a, 40b and 50 is then sent to a control and command box which commands the bidirectional drive system 2 to contract in order to retract the fairing 120, 220 of the nacelle.

The pinion-rack pairs 3a-4a, 3b-4b and 3c-4c are set in motion as described above.

As a result, the sectors 40a, 40b, 50 are retracted in a circumferential direction around the rotor 110, 210 (in the direction of the arrows F2 in FIGS. 1 to 4 and 7 and 8) starting with the end sector 50 which nests in the distal intermediate sector 40a, then the distal intermediate sector 40a nests in the proximal intermediate sector 40b and finally the proximal intermediate sector 40b nests in the fixed sector 30.

When the retractable sectors 40a, 40b and 50 of a series are all nested in each other and within the fixed sector 30 of that series, the rotor 110, 210 is then considered a free rotor.

The propulsion system 100, 200 according to the invention further comprises means for locking in the open position of the fairing 120, 220 of the nacelle, in other words when the retractable sectors 40a, 40b and 50 of a series are all nested within each other and within the fixed sector 30 of this series. These means are, for example, complementary mechanical means carried by the fixed sector 30 and the end sector 50, these complementary means then being configured to secure the end sector 50 to the fixed sector 30, and consequently also all the intermediate sectors. Another solution for locking the sectors in the retracted position would be to block the electric motor 5 in rotation.

Here again, for obvious safety reasons, it is advisable to be able to ensure that the fairing 120, 220 of the nacelle is properly locked in the retracted position. In this way, a control device such as an analogue switch can advantageously be fitted to the propulsion system 100, 200 and be configured to warn a user or a computer that the fairing 120, 220 of the nacelle is actively locked in the retracted position. Similarly, if the analogue switch detects an incorrect locking of the fairing 120, 220 of the nacelle in the retracted position, a warning (e.g. by means of an audible device or an indicator light) could be sent to a user of the aircraft, e.g. on an instrument panel of the aircraft cockpit.

The propulsion system 100, 200 according to the invention thus enables to benefit in a simple and rapid manner, depending on the needs of the aircraft 1, either from ducted rotors or from free rotors. When the fairing 120, 220 of the nacelle is deployed around the rotors 110, 210, a complete rotor fairing is obtained. The fairing 120, 220 of the nacelle of the propulsion system 100, 200 according to the invention thus enables, by its shape, its construction and the materials of which it is made, to act as an acoustic screen against the noise emanating from the rotation of the rotors 110, 210, guaranteeing better attenuation of acoustic emissions but also increased safety of the rotors with respect to possible obstacles while benefiting from the thrust effect of the fairing of the nacelle useful in hovering flight or at low forward speed. When the fairing 120, 220 of the nacelle is retracted in the fixed sectors, the drag induced by the presence of a possible nacelle fairing is virtually eliminated and the propulsive efficiency at high forward speed is greatly improved, the rotors 110, 210 being thus freed.

Thus, the aircraft according to the invention has the interesting advantage of being able to have, as required, either ducted or free rotors.

The invention claimed is:

1. A propulsion system for an aircraft, comprising at least one rotor and a nacelle having a fairing extending around said at least one rotor, said fairing being sectorised and comprising at least one fixed sector and retractable sectors in a circumferential direction with respect to an axis of rotation of the rotor, the retractable sectors comprising at least a first series of retractable sectors which are telescopically retractable into or onto said at least one fixed sector, wherein said retractable sectors further comprise at least a second series of sectors which are telescopically retractable into or onto at least one fixed sector, said at least one fixed sector having an angular extent around said axis which is less than or equal to 90°.

2. The propulsion system according to claim 1, wherein the retractable sector of the first series of sectors are telescopically retractable within each other and within said at least one fixed sector and the retractable sectors of the second series of sectors are telescopically retractable within each other and within said at least one fixed sector.

3. The propulsion system claim 1, wherein the retractable sectors are configured so that a triggering of their retraction is dependent on predetermined flight conditions of the aircraft or on a voluntary command from a user.

4. The propulsion system claim 3, wherein the retractable sectors have a generally tubular shape and each have transverse dimensions that decrease from one circumferential end to an opposite circumferential end.

5. The propulsion system according to claim 1, wherein each of the series of sectors comprises:
an end sector; and
at least one intermediate sector;
the end sector of the first series of sectors comprising final guiding and locking means configured to cooperate with complementary final guiding and locking means with which the end sector of the second series of sectors is provided for a locking of the nacelle fairing in a closed position.

6. The propulsion system according to claim 1, wherein at least some of the sectors comprise sealing means, for example at their circumferential ends, configured to ensure a seal with one or more adjacent sectors.

7. The propulsion system according to claim 1, wherein it comprises a device for actuating the deployment and retraction of the sectors of each series, this device comprising a bidirectional slide drive system for the telescopically deployment and retraction of said sectors, from or inside of or on the fixed sector.

8. The propulsion system according to claim 7, wherein the bidirectional drive system comprises pinions and rack segments set in motion by a same electric motor, the bidirectional system being configured to engage a pinion on at least one rack of the end sector then, successively, to engage pinions on racks of each intermediate sector, step by step, from the fixed sector in the case of the deployment of the fairing of the nacelle or until the fixed sector in the case of the retraction of the fairing of the nacelle.

9. The propulsion system according to claim 8, wherein the sectors comprise at least one slide segment having a U-shaped cross section.

10. A method for commanding the nacelle fairing of the propulsion system for the aircraft according to claim 1 from an open position comprising telescopically deploying the retractable sectors, in the circumferential direction with respect to the axis of rotation of the rotor, wherein said deploying includes:
detecting a predetermined flight condition in automatic command or a manual command of the closure of the fairing of the nacelle;
sending a request to deploy the sectors to a control and command box;
commanding the bidirectional drive system in extension to deploy the fairing of the nacelle according to a circumferential direction around the rotor from said or each fixed sector;
locking the fairing of the nacelle in the deployed position;
detecting and warning a user of the active locking conditions in the deployed position.

11. The commanding method according to claim 10, wherein the predetermined flight condition for automatic command of closure of the fairing of the nacelle is a hover phase of the aircraft or a forward speed of the aircraft less than or equal to 180 km/h.

12. The commanding method according to claim 10, wherein retracting the fairing of the nacelle from a closed position of the fairing of the nacelle comprises the following steps:
detecting a predetermined flight condition in automatic command or a manual command of opening the fairing of the nacelle;
sending a request to retract the sectors to a control and command box;
commanding the bidirectional drive system in contraction to retract the fairing of the nacelle according to a circumferential direction around the rotor until the sectors are completely interlocked in said or each fixed sector;
locking the fairing of the nacelle in the retracted position;
detecting and warning a user of the active locking conditions in the retracted position.

13. The commanding method according to claim 12, wherein the predetermined flight condition of automatic command for opening of the fairing of the nacelle is a forward speed of the aircraft greater than 180 km/h.

14. An aircraft comprises at least one propulsion system according to claim 1, the propulsion system being mounted so as to pivot on the aircraft by a pivot shaft that is offset from the rotor or passes through the rotor.

* * * * *